Feb. 28, 1956 W. E. RILEY ET AL 2,736,334
TWIN-ARCH PIPE LINE SPAN
Filed Nov. 23, 1951 2 Sheets-Sheet 1
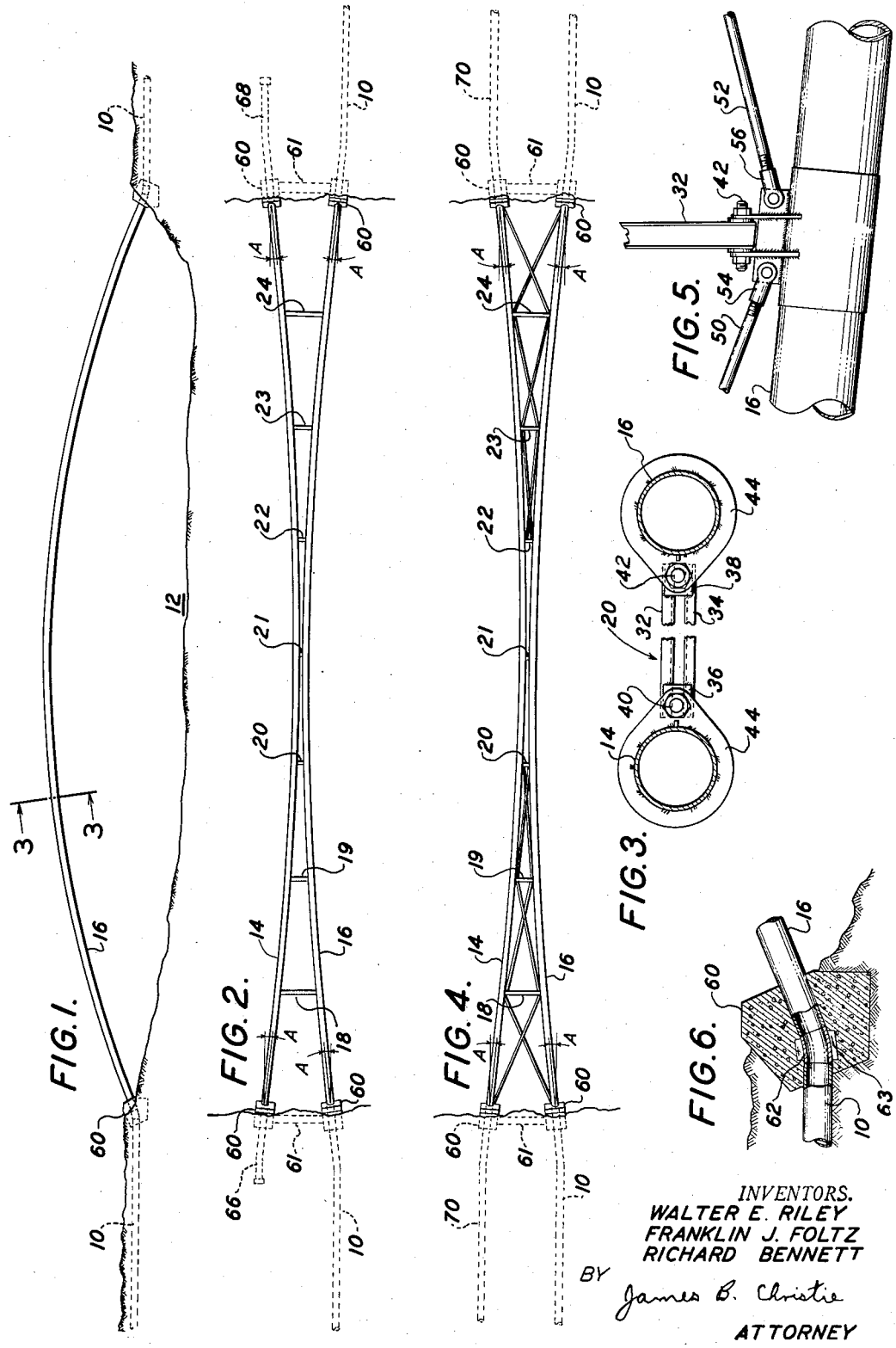
INVENTORS.
WALTER E. RILEY
FRANKLIN J. FOLTZ
RICHARD BENNETT
BY James B. Christie
ATTORNEY Feb. 28, 1956 W. E. RILEY ET AL 2,736,334
TWIN-ARCH PIPE LINE SPAN
Filed Nov. 23, 1951 2 Sheets-Sheet 2
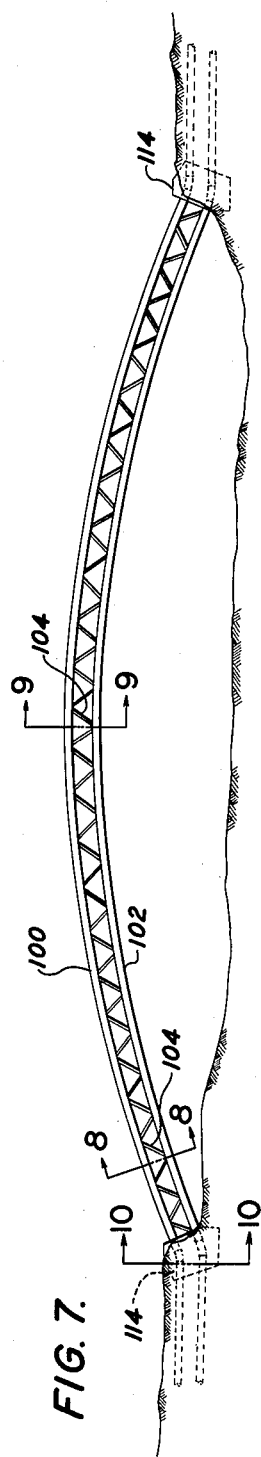
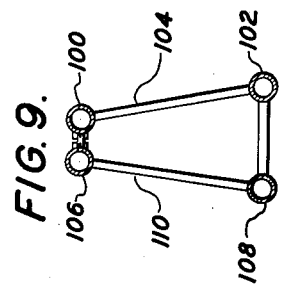
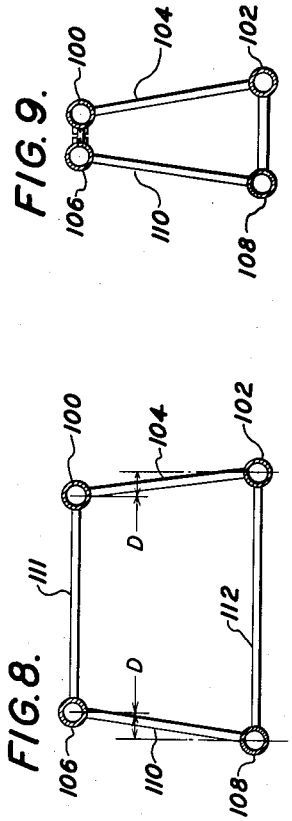
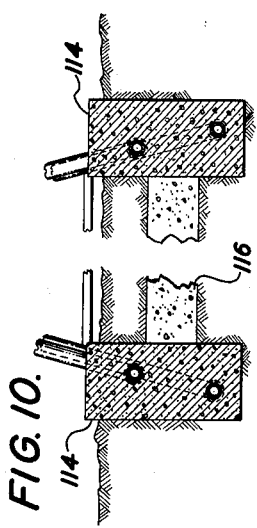
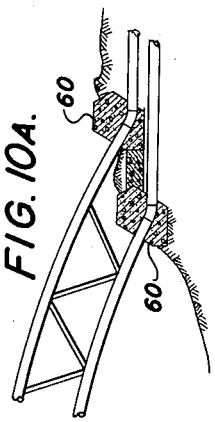
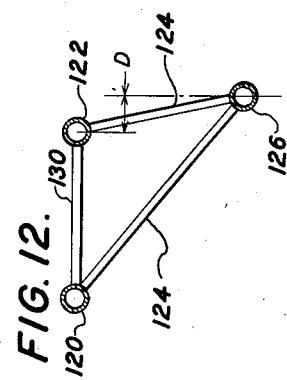
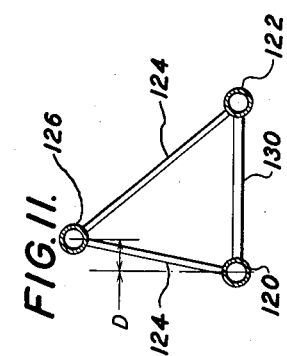
INVENTORS.
WALTER E. RILEY
FRANKLIN J. FOLTZ
RICHARD BENNETT
BY James B. Christie
ATTORNEY

United States Patent Office 2,736,334
Patented Feb. 28, 1956

2,736,334
TWIN-ARCH PIPE LINE SPAN

Walter E. Riley, Franklin J. Foltz, and Richard Bennett, Phoenix, Ariz.

Application November 23, 1951, Serial No. 257,912

3 Claims. (Cl. 137—236)

This invention relates to improved spans for crossing an obstruction, say a river or a gorge, with a pipe line.

Pipe line crossings have been made on existing bridges adjacent the right of way, on special beam spans, on special suspension bridges and by laying the line in a trench (say in a river bottom) and burying it.

Each of these arrangements has certain disadvantages. Ordinarily pipe lines are in open country and existing bridges cannot be utilized. Trenching is very expensive if the obstruction is water. Beam spans are expensive for long crossings because numerous piers are required. Suspension bridges are also expensive, because they require numerous cables and anchorages.

These difficulties are minimized in the present invention by providing a twin-arch pipe line span in which two arched structures are located side by side and inclined so that they are closer together at the center than at the ends of the arches.

In one embodiment of the invention which is particularly suitable for short spans or for long spans in pipe lines which are employed to transport gases, the two arched structures are two curved pipes.

In another embodiment of the invention which is particularly suitable for long spans in pipe lines which are employed to transport heavy substances such as liquids or semi-solids, each of the two arched structures is formed of two pipes, both of which lie in the inclined plane of the arch. The two pipes of each of the arched structures are joined by braces which also lie in the inclined plane of the arch.

In both of these embodiments of the invention, cross braces extend between the two arched structures so as to provide lateral stability while permitting relative displacement between the two arched structures in the vertical direction. Since relative displacement between the two structures is permitted in the vertical direction, the two structures may be employed to carry substances having different weights or temperatures without creating excessive stresses. Also, only one of the arched structures may be employed as a carrier and the other arched structure may serve merely to provide lateral stability for the carrier structure.

In a less satisfactory embodiment of the invention, a twin-arch structure composed of two pipes is paralleled by a third pipe located either above or below the two pipes, and the third pipe is attached to the other two pipes by bracing.

In the various embodiments of the invention, the arched structures are supported in abutments located at the ends of the arches, and one or more of the pipe arches are extended through the abutments and connected to a pipe line. In this manner a considerable portion of the thrust of the arches is supported by the pipe line or lines.

Each span is supported solely by the abutments at the ends of the span and by the pipe line or lines so that it is free to rise or lower with changes in temperature without requiring expansion joints or offset turns. By forming the pipes in the shape of arches, the great structural qualities of an arch are incorporated in the spans without impairing the bursting strength of the pipes.

The invention is explained with reference to the accompanying drawings, in which:

Fig. 1 is a longitudinal elevation of one embodiment of the arched pipe span;

Fig. 2 is a plan view of the span of Fig. 1 showing one form of bracing between the arches;

Fig. 3 is a sectional view along line 3—3 of Fig. 1 showing the construction of one of the horizontal struts or braces;

Fig. 4 is a plan view of the span of Fig. 1 showing an alternative form of bracing between the arches;

Fig. 5 shows how the bracing illustrated in Fig. 4 is joined to the pipes;

Fig. 6 shows one of the abutments employed to support the span;

Fig. 7 is a longitudinal elevation of another embodiment of the arched pipe span;

Fig. 8 is a sectional view along line 8—8 of Fig. 7;

Fig. 9 is a sectional view along line 9—9 of Fig. 7;

Fig. 10 is a sectional view along line 10—10 of Fig. 7;

Fig. 10A shows an alternative arrangement for abutments which may be employed instead of the arrangement shown in Fig. 10; and Figs. 11 and 12 are sectional views which show two other possible arrangements for the arched pipes of Fig. 7.

In Figs. 1 and 2 a pipe line 10 is shown extending from each side of a channel 12 which constitutes an obstruction which must be crossed by the pipe line.

The twin-arch span for crossing the channel 12 comprises a pair of pipes 14 and 16 which are formed in the shape of arches having the same curvature. The pipes 14 and 16 may be composed of a plurality of sections which are joined end to end by welding, by threaded joints, or by bolted joints. The two arches are inclined toward each other so that the pipes are closer together at the center of the arches than at the ends, and the arcuate pipes are connected together at intervals by laterally extending braces or struts which provide lateral stability for the arches while permitting relative displacement between the pipes in the vertical direction.

When the contents and the temperatures of the two pipes are the same, the two arches have substantially the same height; however, when the contents of the two pipes have different weights or temperatures, one of the arches may be somewhat lower than the other since relative displacement between the two pipes is permitted in the vertical direction.

As shown in Fig. 2, seven horizontal struts 18 to 24 are employed to provide lateral stability for the arches. The actual number of struts required in each case is determined by the various structural considerations involved.

By connecting the short struts to the pipes by means of pins, relative displacement between the pipes in the vertical direction is permitted while maintaining the relative spacing between the two pipes substantially fixed. Fig. 3 shows such an arrangement wherein a pair of channel members 32 and 34 are rigidly connected to a pair of blocks 36 and 38 which are rotatably supported by a pair of pins 40 and 42 which extend through holes in the blocks. Each of the pins 40 and 42 is rigidly secured to a pair of spaced rings 44 which encircle the respective pipes and which are welded to them.

The long struts may be rigidly connected to the pipes in a conventional manner such as by welding the struts to gusset plates which in turn are welded to the pipes and to stiffener rings such as the rings 44 shown in Fig. 3. These long struts should be sufficiently flexible to permit some displacement between the two pipes in the vertical direction.

In the arrangement shown in Fig. 2, the struts 18 and 24 may be rigidly connected to the pipes. The other struts, 19 to 23, may be connected to the pipes by pins, as shown in Fig. 3.

If the operating conditions are severe, the portions of the pipes to which the struts are connected should have thicker walls than the other portions of the pipes, so as to compensate for the stress concentration at the welded joints which serve to connect the struts to the pipes.

Fig. 4 shows an alternative bracing arrangement for the arcuate pipes in which "X" bracing is employed in addition to the struts shown in Fig. 2. Angle iron, flat bars or rods may be employed in the "X" bracing.

Fig. 5 shows how "X" bracing in the form of rods 50 and 52 may be joined to a pipe by clevises 54 and 56.

As shown in Fig. 6, the ends of the arcuate pipes are supported by suitable abutments 60, which may be concrete cast around the pipe ends. Struts 61 are employed between the adjacent abutment to distribute lateral loads unless the abutments are located in solid rock, in which case the struts 61 are unnecessary. Each of the abutments has a hole in it which accommodates an elbow 62 connected to an end of the arcuate pipes. Preferably, each of the elbows has a plurality of ribs 63 welded to it so that the ribs extend parallel to the pipe line and are equally spaced around the circumference of the elbow. These ribs help transmit some of the thrust of the arch into the abutment.

As shown in Fig. 2, the two elbows which are connected to the arcuate pipe 16 are also connected to the pipe line 10 so that the arcuate pipe 16 is a part of the pipe line. The other two elbows are connected to short sections of pipe 66 and 68 which may be connected to another pipe line at a subsequent time if desired.

As shown in Fig. 4, the arcuate pipe 14 is connected to a pipe line 70 and the arcuate pipe 16 is connected to the pipe line 10. Thus, in this embodiment of the invention, both of the arcuate pipes are employed as conduits.

In the arrangement shown in Fig. 2, a considerable portion of the thrust of the arches is supported by the pipe line, and in the arrangement shown in Fig. 4, an even greater portion of the thrust of the arches is supported by the two pipe lines. Thus, relatively small abutments may be employed.

It will be apparent that when only one pipe is required as a carrier in a twin-arch span, the other arcuate member of the span need not be a pipe but can be of any suitable structure, such as a channel member.

The angle A shown in Figs. 2 and 4 represents the inclination of the pipe arches. It will be apparent that different arch structures will have different angles of inclination, and that in some instances, such as in short spans, the inclination may be zero (i. e. the angle A will be zero).

The twin-arch span shown in Fig. 1 is particularly suitable for short spans, or for long spans in pipe lines which are employed to transport gases. When the medium transported is a liquid or a semi-solid, an unbalanced loading condition results when the medium first enters the arch because it must rise to the top of the arch before the far side of the arch is loaded. Such partial loading of the arch creates stresses which are excessive for long arches.

By utilizing two structures of the type shown in Fig. 1 with one located above the other and with the two structures tied together with bracing, the resulting span is capable of withstanding partial loading and long spans of this type may be used for transporting heavy substances such as liquids or semi-solids.

Such a structure employing four arched pipes is shown in Figs. 7 to 10. In the twin-arch structure shown in these figures, each of the two arched structures is formed of two pipes which are tied together with bracing. One of the arched structures comprises pipes 100 and 102 and the bracing 104, and the other arched structure comprises pipes 106 and 108 and the bracing 110. Preferably, both the top and bottom pipes and the bracing which form each of the arched structures lie in the inclined plane of the respective arches. Also, it is preferable that the spacing between the pipes 100 and 102, and the spacing between the pipes 106 and 108, be the same at the ends of the span as at the center, as shown in Figs. 8 and 9.

The horizontal spacing D between the vertically spaced pipes will be different for different arch structures, and in some instances, such as in short spans, the spacing D may be zero.

The bracing 111 and 112 which is employed between the pipes 100 and 106 and between the pipes 102 and 108 should provide lateral stability for the two arched structures while permitting relative displacement between the two arched structures in the vertical direction. This lateral bracing may be the type shown in either Fig. 2 or Fig. 4, with the long struts rigidly connected to the pipes as indicated in Fig. 8, and the short struts connected to the pipes by pins.

Fig. 9 shows the upper lateral brace connected to the pipes by pins and the lower lateral brace rigidly connected to the pipes. It will be apparent that in some instances both the upper and the lower lateral braces should be connected to the pipes by pins.

As shown in Fig. 10, the ends of the span are supported by abutments 114 which are similar to but larger than the abutment 60 shown in Fig. 6. Struts 116 are employed between the adjacent abutments to distribute lateral loads unless the abutments are located in solid rock, in which case the struts 116 are unnecessary.

Each of the abutments has two holes in it which accommodate two elbows which are connected to the ends of the two arcuate pipes which are supported by the abutment. As before, one or more of the arcuate pipes may be connected to a pipe line, and a considerable portion of the thrust of the arches is supported by the pipe line or lines.

Fig. 10A shows an alternative arrangement for abutments which may be employed instead of the arrangement shown in Fig. 10 so as to reduce the amount of material required for the abutments. Four abutments 60 of the type shown in Fig. 6 are employed at each end of the span, and the four abutments are connected together by struts.

Figs. 11 and 12 are sectional views of two other possible arrangements for the arched pipes of Fig. 7, wherein three arcuate pipes are employed instead of the four pipes shown in Figs. 8 and 9.

A twin-arch structure, composed of two arcuate pipes 120 and 122, similar to the pipes 14 and 16 shown in Figs. 1 and 2, is attached by braces 124 to a third pipe 126 which extends either above or below the two pipes in the form of an arch which lies in an inclined plane. The two arcuate pipes 120 and 122 are connected by horizontal struts 130, of the type shown in either Fig. 2 or Fig. 4, so as to provide lateral stability between the two pipes while permitting relative displacement between the pipes 120 and 122 in the vertical direction.

The arch formed by the third pipe 126 lies in the same inclined plane as that of the arch formed by one of the other two pipes. As before, the horizontal spacing D between the vertically spaced pipes will be different for different arch structures, and in some instances the spacing D may be zero.

Abutments of the general type shown in either Fig. 10 or 10A may be employed in the spans shown in Figs. 11 and 12.

The arrangement shown in Figs. 11 and 12 does not have the inherent flexibility of the other embodiments of the invention because the pipe 126 is displaced laterally when the pipes 120 and 122 are displaced different amounts in the vertical direction. Thus, the other embodiments of the invention are preferred.

It will be apparent that the twin-arch spans disclosed herein may be employed to cross various types of obstructions and that multiple twin-arch spans may be employed to cross wide obstructions such as swamps or shallow lakes.

We claim:

1. A pipe line span for crossing an obstruction comprising abutments located at each end of the span, a pair of curved pipes extending between the abutments and over the obstruction in the form of adjacent arches, the arches being inclined toward each other so that the opposed surfaces of the pipes are closer together at the center of the arches than at the ends, a plurality of struts extending between the two pipes for providing lateral stability, the struts being connected to the respective pipes by horizontal pivots so that the pivots permit relative movement between the two pipes in the vertical direction while maintaining the relative spacing between the two pipes substantially fixed, and at least one of the curved pipes being coupled to portions of a pipe line which extend from opposite sides of the obstruction, with the end portions of the curved pipe forming obtuse angles with respect to the portions of the pipe line to which they are coupled so that a portion of the thrust of the arches is supported by the portions of the pipe line which extend from opposite sides of the arch.

2. A pipe line span for crossing an obstruction comprising a pair of curved pipes extending across the obstruction and disposed in the form of adjacent arches, at least one strut extending between the two pipes with the strut being connected to the respective pipes by horizontal pivots so that the pivots permit relative movement between the two pipes in the vertical direction while maintaining the relative spacing between the two pipes substantially fixed, at least one of the curved pipes being coupled to and forming part of a pipe line which extends from opposite sides of the obstruction, with the end portions of the curved pipe forming obtuse angles with respect to the portions of the pipe line which extend from the sides of the obstruction, so that a portion of the thrust of the arches is supported by the portions of the pipe line which extend from opposite sides of the arch, and abutments located at the ends of the arches and disposed around the respective pipes to support a portion of the thrust of the arches.

3. A pipe line span for crossing an obstruction comprising two pairs of pipes curved in the shape of arches extending over the obstruction, the pipes of one pair being located side by side and the pipes of the second pair being located side by side and below the pipes of the first pair, the arches formed by the upper pair of pipes and the arches formed by the lower pair of pipes being inclined so that the opposed surfaces of the respective pairs of pipes are closer together at the center of the arches than at the two ends of the arches, the spacing between the lower pair of pipes being greater than the spacing between the upper pair of pipes and the respective upper and lower pipes of each side of the span being located in substantially the same inclined planes, bracing means extending between the two pipes of each pair of pipes and coupled to the respective pipes by horizontal pivots for maintaining the relative spacing between the two pipes fixed and for providing relative vertical displacement between the two pipes in response to different load conditions in the two pipes, bracing means coupled to and extending between the pipes which are located one above the other for maintaining the relative spacing between these pipes fixed, and at least one of the curved pipes being coupled to portions of a pipe line which extend from opposite sides of the obstruction, with the end portions of the curved pipe forming obtuse angles with respect to the portions of the pipe line to which they are coupled, so that a portion of the thrust of the arches is supported by the portions of the pipe line which extend from opposite sides of the arch.

References Cited in the file of this patent

UNITED STATES PATENTS

| | | |
|---|---|---|
| 15,823 | Rogers | Sept. 30, 1856 |
| 37,642 | Rogers | Feb. 10, 1863 |
| 1,839,812 | Strauss | Jan. 5, 1932 |
| 2,221,919 | Kenan | Nov. 19, 1940 |

FOREIGN PATENTS

| | | |
|---|---|---|
| 361,794 | Great Britain | Nov. 26, 1931 |
| 704,833 | Germany | Apr. 8, 1941 |

OTHER REFERENCES

Scientific American, Feb. 22, 1902, page 117.
Scientific American, Dec. 25, 1915, page 561.
Engineering News Record, Nov. 16, 1950, page 26.